Sept. 29, 1936.　　　P. CROSLEY, JR　　　2,055,519
ANTENNA DEVICE FOR VEHICLES
Filed June 28, 1932
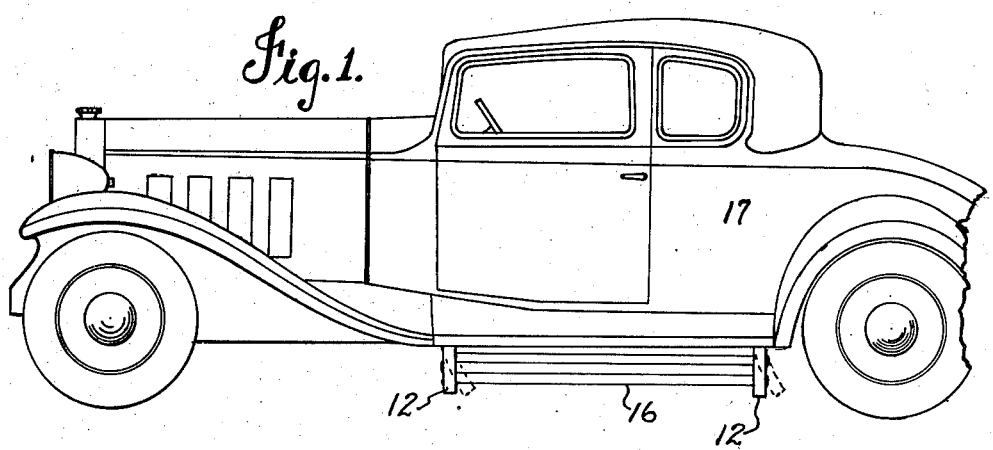
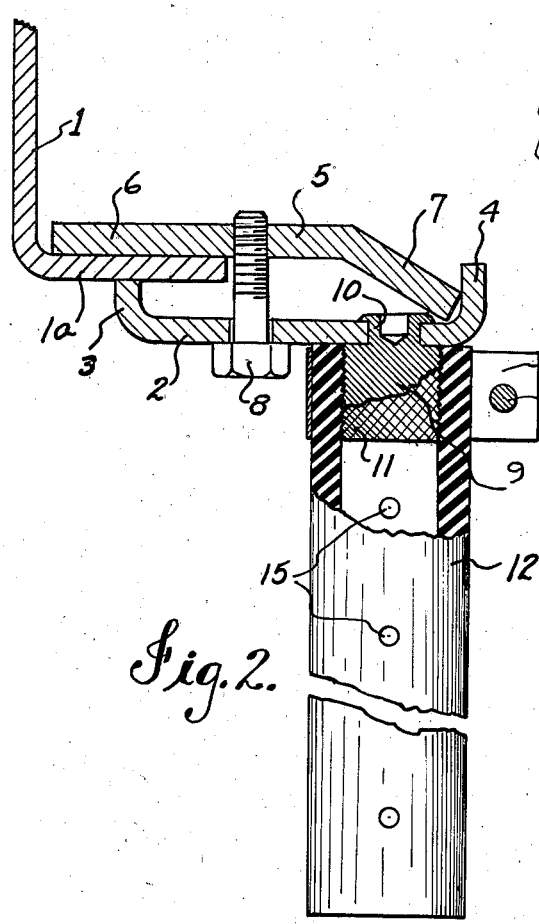
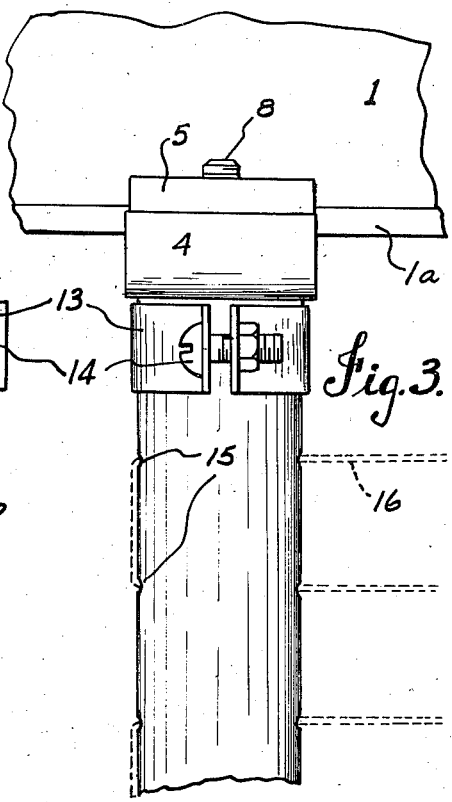
INVENTOR.
Powel Crosley, Jr.,
BY Allen & Allen
ATTORNEY.

Patented Sept. 29, 1936

2,055,519

UNITED STATES PATENT OFFICE 2,055,519

ANTENNA DEVICE FOR VEHICLES

Powel Crosley, Jr., Cincinnati, Ohio, assignor to The Crosley Radio Corporation, Cincinnati, Ohio, a corporation of Ohio Application June 28, 1932, Serial No. 619,723

6 Claims. (Cl. 250—33)

My invention relates to devices for the interception of radio waves, for use on vehicles such as the automobile. It has been usual to provide an aerial for automobiles which is built into the top of the car, or fastened to the top beneath the upholstery cloth. Such constructions are relatively expensive, and in some types of cars are inefficient due to the shielding effect of metal body members which come up around the edges of the top.

It is an object of my invention to do away with these disadvantages and to provide a construction which is at once cheap and efficient, which is as readily attached to old cars as to cars in the course of construction, and which does not require the removal of other parts.

It is my object to provide an efficient under-car antenna. If a system of insulated wiring be strung beneath a car, it is adapted to act as a counterpoise, the metallic framework of the car serving as the aerial. But as a device for intercepting radio waves, an under-car wiring system varies as to its efficiency substantially in inverse ratio to its distance from the ground. If it is to be reasonably efficient, it must be located as close to the ground as is reasonably possible. Difficulty arises from the fact that the modern automobile is swung as low to the ground as is practicable in view of the necessary clearance for the ordinarily-to-be-expected obstacles in the roadway. This means that an under-car antenna must project definitely down into the danger zone. It is my object, therefore, to provide an under-car antenna and mounting therefor which will withstand the abrasion of moving objects beneath the car, and will give with respect to obstacles without permanent dislocation or disturbance of its parts.

These and other objects of my invention which will be set forth hereinafter or will be apparent to one skilled in the art upon reading these specifications, I accomplish by that certain construction and arrangement of parts of which I shall now describe a preferred embodiment, reference being had to the drawing, wherein:

Figure 1 shows a car with my device in operative position thereon.

Fig. 2 is a side elevation of my preferred mounting means, with parts in section.

Fig. 3 is an end elevation of my mounting means.

In the practice of my invention, I provide a pair or more of interspaced supporting devices which are either themselves of insulating substance, or are provided with insulators for the reception of wire or other members forming the antenna. The supporting devices are resiliently mounted or are themselves resilient so that they will give when struck by another object, and will return to normal position when released. Means are provided for attaching the supporting devices to a car body or frame in such a way that preferably the supporting devices are interspaced longitudinally of the car. Wires are then strung back and forth between the supports.

I prefer to use wires rather than other elements, since they are more durable and at the same time offer less resistance to obstructions. I have found that other antenna devices, such as strips of cloth with wires or other conductors embedded in them, are very soon cut to pieces by small stones thrown up by wheels. Wires are moreover easily removable in case of breakage.

Finally, I prefer to attach my supporting devices to the car in such a way that under conditions of unusual strain they will be released, whereby greater damage to the car is avoided.

In Fig. 2, I have indicated at 1 a portion of the car frame having a turned over flange 1a. The car frame is a convenient point of attachment for my supporting devices, but they may be attached to other members if desired. 2 is a clamping member having a turned up gripping edge 3 at one end, and a flange member 4 at the other. 5 is a co-operating clamping member having a portion 6 to engage the frame of the car and an angularly bent portion 7 to lie behind the flange 4. A bolt 8 passes loosely through a hole in the member 2 and is threaded into the member 5, whereby the parts may be brought into tight engagement. Strap iron an inch and a half in width is a convenient material from which to make this clamping device. As is clearly shown in Fig. 2, the engagement of the portion 7 of the upper clamping member behind the flange 4 of the lower clamping member not only provides a fulcrum for the clamp, but also prevents such a rotation of any part of the clamp with respect to the other as would permit the clamp to come loose.

I have shown a post or stud 9, having a reduced end portion 10, which passes through a hole in the clamp member 2, and is upset therebeyond so that the post 9 is securely fastened in place. The post preferably has a knurled surface 11 and a diameter sufficient to permit it to slip inside a piece of ordinary rubber hose 12, which is cut to whatever length desired, preferably such a length as will bring its lower end to within a short distance of the ground when the clamp is fastened in position on the car.

Among the various types of supporting member which I may use I have found a piece of rubber hose to be the most convenient and cheapest. It has a continuous resiliency which well adapts it to my objects as outlined hereinabove, and renders a hinged support unnecessary. I prefer to fasten it to the post 9 by an ordinary hose clamp 13, having a tightening bolt 14. I provide holes 15 at spaced intervals in my supporting device for the reception of wires 16. These holes may conveniently be made by means of a hot iron, or otherwise. The wires are strung through these holes in non-inductive relationship as shown. Ordinarily my device will be located along the line of the running board and beneath it, or off the edge thereof, depending upon the place where convenient means are provided on the car for the attachment of the clamp. The clamp may be varied to suit the particular requirements of the place of attachment thereof, or may be dispensed with in some forms, the post 9 being attached directly to a member on the car. When my supports strike an object they will give as indicated in dotted lines in Figure 1, where the exemplary form of my device which I have described herein is shown as attached to an automobile body 7. A conductive connection is made between the wires 16 and the antenna post of the set within the car, the ground post being, of course, connected with the frame of the car.

Under conditions of unusual strain, the resilient member 12 will pull away from the post 9, preventing damage to other parts of the car; but when this happens it may easily be re-attached and the clamp tightened. I have described hereinabove the best form of my invention which I have so far devised, it being understood that modifications may be made therein without departing from the spirit of my invention.

Having thus described my invention, what I claim as new and desire to secure by Letters Patent, is:—

1. In a vehicle antenna, a plurality of studs mounted at interspaced points upon said vehicle, pieces of rubber hose or its equivalent mounted upon said studs, said pieces of hose having holes transversely formed therein, and a wire passing through said holes and held by said pieces of hose.

2. In a vehicle antenna adapted to be placed beneath the vehicle, a clamping device comprising an upper and a lower clamping jaw, means for fastening said jaws together, a mounting device upon one of said jaws, and a resilient rod-like member held by said mounting device, said member being of insulating substance and having means for holding metallic members for intercepting radio waves, said resilient member being detachable from said mounting device under unusual strain, and being capable of giving by bending throughout if struck by an obstruction on the roadway and of thereafter returning to its normal position by its own resilience.

3. In a vehicle antenna, clamping means comprising upper and lower clamping jaws, means for holding said jaws together, a stud mounted upon one of said jaws having a diameter permitting it to be inserted in a hollow portion of a piece of rubber hose, a piece of rubber hose mounted on said stud, a clamping device engaging said hose exteriorly substantially at the point where it is engaged by said stud, said hose having holes for the reception of wires forming a pick-up device.

4. In a vehicle antenna, a pair of clamping means each comprising upper and lower clamping jaws, means for holding said jaws together, a stud mounted upon one of said jaws having a diameter permitting it to be inserted in the hollow portion of a piece of rubber hose, a piece of rubber hose mounted on said stud, a clamping device engaging said hose exteriorly substantially at the point where it is engaged by said stud, said clamping means and associated mechanism being located at interspaced points on a vehicle frame, said pieces of hose being perforated for the reception of wires and a wire passing a plurality of times between said pieces of hose forming a pick-up device.

5. In a vehicle antenna, a clamping device comprising an upper and a lower clamping jaw, means for fastening said jaws together, a mounting device upon one of said jaws, and a resilient rod-like member held by said mounting device, a second such device and associated parts, said devices located at interspaced points on the frame of a vehicle, said rod-like members extending toward the ground, and a wire passing between said rod-like members and supported thereby substantially parallel with and close to the ground, said rod-like members capable of giving by bending throughout if struck by an obstruction on the roadway and of returning to normal position through their own resilience.

6. In an under-car antenna, a plurality of rods of insulating substance, means for holding said rods in interspaced relationship by rigid engagement therewith, and an antenna structure strung between said rods, said rods being of resilient and easily bendable substance capable of giving by bending throughout if struck by an obstruction on the roadway and of returning to normal position by their bodily resilience.

POWEL CROSLEY, Jr.